(12) United States Patent
Kokubo

(10) Patent No.: US 7,516,986 B2
(45) Date of Patent: Apr. 14, 2009

(54) STEERING SUPPORT BEAM (75) Inventor: Sadao Kokubo, Oyama (JP)

(73) Assignee: Showa Denko K.K., Tokyo (JP)

( * ) Notice: Subject to any disclaimer, the term of this patent is extended or adjusted under 35 U.S.C. 154(b) by 0 days.

(21) Appl. No.: 11/597,171

(22) PCT Filed: May 20, 2005

(86) PCT No.: PCT/JP2005/009725
§ 371 (c)(1),
(2), (4) Date: Nov. 21, 2006

(87) PCT Pub. No.: WO2005/113320
PCT Pub. Date: Dec. 1, 2005

(65) Prior Publication Data
US 2007/0222200 A1 Sep. 27, 2007

Related U.S. Application Data (60) Provisional application No. 60/574,568, filed on May 27, 2004.

(30) Foreign Application Priority Data
May 21, 2004 (JP) ............................. 2004-151403

(51) Int. Cl.
B62D 1/16 (2006.01)
(52) U.S. Cl. ...................................... 280/779
(58) Field of Classification Search ................. 280/779, 280/752; 180/90; 296/70, 72, 191, 192, 296/194, 203.2
See application file for complete search history.

(56) References Cited

U.S. PATENT DOCUMENTS

| 4,432,565 | A | * | 2/1984 | Suzuki et al. | ............... 280/779 |
| 4,946,195 | A | * | 8/1990 | Ioka et al. | ................... 280/777 |
| 5,238,286 | A | * | 8/1993 | Tanaka et al. | ................. 296/70 |
| 5,282,637 | A | * | 2/1994 | McCreadie | ............ 296/203.02 |
| 5,934,733 | A | * | 8/1999 | Manwaring | .................. 296/72 |
| 6,092,840 | A | * | 7/2000 | Sugawara | ................... 280/779 |
| 6,196,588 | B1 | * | 3/2001 | Sugawara | ................... 280/779 |
| 7,048,325 | B1 | * | 5/2006 | Sandhu | .................. 296/193.02 |
| 2002/0056982 | A1 | * | 5/2002 | Brownlee et al. | ........... 280/779 |
| 2007/0035117 | A1 | * | 2/2007 | Green | ........................ 280/775 |

FOREIGN PATENT DOCUMENTS

JP 63 133473 8/1988
JP 5 238421 9/1993

(Continued)

Primary Examiner—Faye M. Fleming
(74) Attorney, Agent, or Firm—Oblon, Spivak, McClelland, Maier & Neustadt, P.C.

(57) ABSTRACT

A steering support beam 1 includes a cylindrical support beam body 2 and a plurality of brackets 10, 13, 20, 23 and 26 each having a fitting portion fitted on the cylindrical support beam body 2 and fixed thereto. The fitting portion of at least one of the brackets 20 is fixed to the support beam body 2 in a state in which the fitting portion of at least one of the brackets 20 is positioned with respect to the support beam 2 by being interposed by an outer pipe 3 fitted on the support beam 2 between the fitting portion of at least one of the brackets 20 and the fitting portion of the other bracket 10.

19 Claims, 7 Drawing Sheets

FOREIGN PATENT DOCUMENTS

| | | |
|---|---|---|
| JP | 6 57771 | 8/1994 |
| JP | 8 183462 | 7/1996 |
| JP | 11 59484 | 3/1999 |
| JP | 11 227552 | 8/1999 |
| JP | 2001 253368 | 9/2001 |
| JP | 2002 193109 | 7/2002 |
| JP | 2003 252244 | 9/2003 |
| JP | 2004 501024 | 1/2004 |

* cited by examiner

STEERING SUPPORT BEAM

This application claims priority to Japanese Patent Application No. 2004-151403 filed on May 21, 2004 and U.S. Provisional Application No. 60/574,568 filed on May 27, 2004, the entire disclosures of which are incorporated herein by reference in their entireties.

CROSS REFERENCE TO RELATED APPLICATIONS

This application is an application filed under 35 U.S.C. §111(a) claiming the benefit pursuant to 35 U.S.C. §119(e)(1) of the filing date of U.S. Provisional Application No. 60/574,568 filed on May 27, 2004, pursuant to 35 U.S.C. §111(b).

TECHNICAL FIELD

This invention relates to a steering support beam to be mounted in a vehicle body such as an automobile body so as to bridge right and left sides thereof. In this specification, the wording of "aluminum" denotes aluminum and its alloy.

BACKGROUND ART

The following description sets forth the inventor's knowledge of related art and problems therein and should not be construed as an admission of knowledge in the prior art.

At a forward side of an instrument panel provided in a vehicle front portion, a steering support beam is mounted so as to bridge right and left front pillars of the vehicle. Such a steering support beam secures sufficient rigidity and strength against a collision, etc., from the side of the vehicle. A plurality of brackets are to be welded to the steering support beam, and various vehicle parts are to be fixed to the brackets.

In welding the brackets to the steering support beam, brazing jigs are used to position the brackets with a high degree of accuracy. However, in cases where plural brackets are positioned with such brazing jigs, the structure of the jig becomes complicated, deteriorating the welding workability. Furthermore, in cases where a bracket to which a large-load stay is to be fixed is welded to the steering support beam, it is required to pay special attention to, e.g., a joint shape and/or welding quality so as not to cause stress concentration.

As a technique for facilitating positioning of brackets, it is known that a flange, an internal fitting groove or the like is formed along the longitudinal direction of a support beam so that brackets can be fitted to the flange or the groove (see JP, H05-238421, A (claims 1 and 3 and FIGS. 1 and 7), and JP, 2004-501024, A (claim 1 and FIG. 1), for example).

According to the technique disclosed by the aforementioned patent documents, although positioning of brackets can be facilitated, welding workability deteriorates due to the existence of the flange or the internal fitting groove. In cases where a flange is formed along a longitudinal direction of a steering support beam, it becomes difficult to decrease the entire weight of the steering support beam because the flange increases the entire weight, and furthermore the manufacturing cost of the steering support beam increases. On the other hand, in cases where an internal fitting groove is formed along the longitudinal direction of the steering support beam, it is required to increase the thickness of the beam peripheral wall to form the groove, increasing the weight of the beam, which in turn makes it difficult to decrease the weight.

The description herein of advantages and disadvantages of various features, embodiments, methods, and apparatus disclosed in other publications is in no way intended to limit the present invention. Indeed, certain features of the invention may be capable of overcoming certain disadvantages, while still retaining some or all of the features, embodiments, methods, and apparatus disclosed therein.

Other objects and advantages of the present invention will be apparent from the following preferred embodiments.

DISCLOSURE OF INVENTION

The preferred embodiments of the present invention have been developed in view of the above-mentioned and/or other problems in the related art. The preferred embodiments of the present invention can significantly improve upon existing methods and/or apparatuses.

The present invention was made in view of the aforementioned technical background, and aims to provide a steering support beam light in weight and low in cost and capable of easily positioning brackets with a high degree of accuracy and enhancing welding workability.

To attain the aforementioned objects, the present invention provides the following means.

[1] A steering support beam, comprising:
a cylindrical support beam body; and
a plurality of brackets each having a fitting portion fitted on the cylindrical support beam body and fixed thereto,
wherein the fitting portion of at least one of the brackets is fixed to the support beam body in a state in which the fitting portion of at least one of the brackets is positioned with respect to the support beam by being interposed by an outer pipe fitted on the support beam between the fitting portion of at least one of the brackets and the fitting portion of the other bracket.

[2] A steering support beam, comprising:
a cylindrical support beam body;
a first front pillar attaching bracket having a fitting portion fitted on a first end portion of the cylindrical support beam body and fixed thereto;
a second front pillar attaching bracket having a fitting portion fitted on a second end portion of the cylindrical support beam body and fixed thereto; and
a plurality of parts attaching brackets each having a fitting portion fitted on a longitudinal intermediate portion of the support beam body and fixed thereto,
wherein the fitting portion of at least one of the plurality of parts attaching brackets is fixed to the support beam body in a state in which the fitting portion of at least one of the plurality of parts attaching brackets is positioned with respect to the support beam by being interposed by an outer pipe fitted on the support beam between the fitting portion of one of the plurality of parts attaching brackets and the first front pillar attaching bracket or the second front pillar attaching bracket.

[3] A steering support beam, comprising:
a cylindrical support beam body;
a first front pillar attaching bracket having a fitting portion fitted on a first end portion of the cylindrical support beam body and fixed thereto;
a second front pillar attaching bracket having a fitting portion fitted on a second end portion of the cylindrical support beam body and fixed thereto;
an air-bag unit attaching bracket having a fitting portion fitted on a longitudinal intermediate portion of the support beam body and fixed thereto; and
a steering attaching bracket having a fitting portion fitted on a longitudinal intermediate portion of the support beam body and fixed thereto,
wherein the fitting portion of the air-bag unit attaching bracket is fixed to the support beam body in a state in which the fitting portion of the air-bag unit attaching bracket is positioned with respect to the support beam by being interposed by an outer pipe fitted on the support beam between the fitting portion of the air-bag unit attaching bracket and the first front pillar attaching bracket, and wherein the fitting portion of the steering attaching bracket is fixed to the support beam body in a state in which the fitting portion of the steering attaching bracket is positioned with respect to the support beam by being interposed by an outer pipe fitted on the support beam between the fitting portion of the steering attaching bracket and the second front pillar attaching bracket.

[4] The steering support beam as recited in any one of the aforementioned Items 1 to 3, wherein the fixing of the fitting portion of the bracket to the support beam body is performed by welding.

[5] The steering support beam as recited in the aforementioned Item 4, wherein the fitting portion of the bracket is fixed to the support beam body by welding at least one of axial edge portions of the fitting portion of the bracket along the circumferential direction thereof.

[6] The steering support beam as recited in the aforementioned Item 4, wherein the fitting portion of the bracket is provided with an elongate aperture, and wherein the fitting portion of the bracket is welded to the support beam body at the elongate aperture.

[7] The steering support beam as recited in the aforementioned Item 6, wherein the elongate aperture is formed along an axial direction or a circumferential direction of the fitting portion of the bracket.

[8] The steering support beam as recited in the aforementioned Item 4, wherein the fitting portion of the bracket is provided with a cut-out portion at a part of a periphery of the fitting portion, and wherein the fitting portion of the bracket is welded to the support beam body at the cut-out portion.

[9] The steering support beam as recited in any one of the aforementioned Items 1 to 3, wherein the fitting portion of the bracket is fixed to the support beam body by forming a friction stir welded portion at a part of a periphery of the fitting portion of the bracket.

[10] The steering support beam as recited in any one of the aforementioned Items 1 to 9, wherein the support beam body, the outer pipe and the brackets are extruded members.

[11] The steering support beam as recited in any one of the aforementioned Items 1 to 9, wherein the support beam body and the outer pipe are extruded members, and the brackets are cast members.

[12] The steering support beam as recited in the aforementioned Item 10 or 11, wherein the extruded member is made of light metal or its alloy.

[13] The steering support beam as recited in the aforementioned Item 10 or 11, wherein the extruded member is an aluminum extruded member.

[14] The steering support beam as recited in the aforementioned Item 10 or 11, wherein the extruded member is a synthetic resin extruded member.

[15] An instrument panel mounting structure using the steering support beam as recited in any one of the aforementioned Items 1 to 14.

[16] A vehicle provided with the steering support beam as recited in any one of the aforementioned Items 1 to 14.

[17] A steering support beam, characterized in that fitting portions of a plurality of brackets are fitted on a cylindrical support beam body, a fitting portion of at least one bracket among a plurality of brackets is fixed to the support beam body by being positioned by an outer pipe fitted on the support beam body and disposed between the fitting portion and a fitting portion of another bracket.

[18] A steering support beam, characterized in that fitting portions of front pillar attaching side brackets are fitted on and fixed to both end portions of a cylindrical support beam body, fitting portions of plural vehicle parts attaching brackets are fitted on an axial intermediate portion of the support beam body, and a fitting portion of at least one vehicle parts attaching bracket among a plurality of vehicle parts attaching brackets is fixed to the support beam body by being positioned by an outer pipe fitted on the support beam body and disposed between the fitting portion and a fitting portion of the side bracket.

[19] A steering support beam, characterized in that fitting portions of front pillar attaching side brackets are fitted on and fixed to both end portions of a cylindrical support beam body, a fitting portion of an air-bag unit attaching bracket and a fitting portion of a steering attaching bracket are fitted on and fixed to an axial intermediate portion of the support beam body, wherein the fitting portion of the air-bag unit attaching bracket is fixed to the support beam body by being positioned by an outer pipe fitted on the support beam and disposed between the fitting portion of the air-bag unit attaching bracket and a fitting portion of a side bracket located at one side, and wherein the fitting portion of the steering attaching bracket is fixed to the support beam body by being positioned by an outer pipe fitted on the support beam and disposed between the fitting portion of the steering attaching bracket and a fitting portion of a side bracket located at the other side.

[20] The steering support beam as recited in any one of the aforementioned Items 17 to 19, wherein the fixing is performed by welding.

[21] The steering support beam as recited in the aforementioned Item 20, wherein an opened portion is formed at a part of a periphery of the fitting portion of the bracket, and wherein the fitting portion of the bracket and the support beam body are welded each other at the opening portion.

[22] The steering support beam as recited in any one of the aforementioned Items 17 to 19, wherein the fitting portion of the bracket and the support beam body are fixed each other by forming a friction stir welded portion at a part of a periphery of the fitting portion of the bracket.

According to the invention as recited in Item [1], since the fitting portion of at least one of the brackets is fixed to the support beam body in a state in which the fitting portion of at least one of the brackets is positioned with respect to the support beam by being interposed by an outer pipe fitted on the support beam between the fitting portion of at least one of the brackets and the fitting portion of the other bracket, the at least one of the brackets can be positioned and fixed to the support beam body with a high degree of accuracy. Furthermore, it becomes possible to position the bracket with a high degree of accuracy by simply providing the outer pipe and it is not required to form a flange or an internal fitting groove extending in the longitudinal direction of the support beam body which was required in a prior art. This makes it possible to enhance the welding workability and productivity, and also makes it possible to simplify the structure and decrease the weight. Furthermore, since the positioning of at least one of the brackets can be attained by the outer pipe, the structure of welding jigs can be simplified, which in turn can further improve the welding workability. Moreover, the steering support beam can be enhanced in strength because of the double tube structure that the outer pipe is fitted on the support beam.

According to the invention as recited in Item [2], the fitting portion of at least one of the plurality of parts attaching brackets is fixed to the support beam body in a state in which the fitting portion of at least one of the plurality of parts attaching brackets is positioned with respect to the support beam by being interposed by an outer pipe fitted on the support beam between the fitting portion of one of the plurality of parts attaching brackets and the first front pillar attaching bracket or the second front pillar attaching bracket. Therefore, the at least one of the parts attaching brackets can be positioned and fixed to the support beam body with a high degree of accuracy. Furthermore, it becomes possible to position the bracket with a high degree of accuracy by simply providing the outer pipe and it is not required to form a flange or an internal fitting groove extending in the longitudinal direction of the support beam body which was required in a prior art. This makes it possible to enhance the welding workability and productivity, and also makes it possible to simplify the structure and decrease the weight. Furthermore, since the positioning of at least one of the parts attaching brackets can be attained by the outer pipe, the structure of welding jigs can be simplified, which in turn can further improve the welding workability. Moreover, the steering support beam can be enhanced in strength because of the double tube structure that the outer pipe is fitted on the support beam.

According to the invention as recited in the aforementioned Item [3], the fitting portion of the air-bag unit attaching bracket is fixed to the support beam body in a state in which the fitting portion of the air-bag unit attaching bracket is positioned with respect to the support beam by being interposed by an outer pipe fitted on the support beam between the fitting portion of the air-bag unit attaching bracket and the first front pillar attaching bracket, and the fitting portion of the steering attaching bracket is fixed to the support beam body in a state in which the fitting portion of the steering attaching bracket is positioned with respect to the support beam by being interposed by an outer pipe fitted on the support beam between the fitting portion of the steering attaching bracket and the second front pillar attaching bracket. Therefore, the air-bag unit attaching bracket and the steering attaching bracket can be positioned and fixed to the support beam body with a high degree of accuracy. Furthermore, it becomes possible to position each bracket with a high degree of accuracy by simply providing the outer pipe and it is not required to form a flange or an internal fitting groove extending in the longitudinal direction of the support beam body which was required in a prior art. This makes it possible to enhance the welding workability and productivity, and also makes it possible to simplify the structure and decrease the weight. Furthermore, since the positioning of the air-bag unit attaching bracket and the steering attaching bracket can be attained by the outer pipe, the structure of welding jigs can be simplified, which in turn can further improve the welding workability. Moreover, the steering support beam can be enhanced in strength because of the double tube structure that the outer pipe is fitted on the support beam.

According to the invention as recited in the aforementioned Item [4], since the fixing of the fitting portion of the bracket to the support beam body is performed by welding, it is possible to further decrease the weight of the steering support beam.

According to the invention as recited in the aforementioned Item [5], since the fitting portion of the bracket is fixed to the support beam body by welding at least one of axial edge portions of the fitting portion of the bracket along the circumferential direction thereof, the bracket can be assuredly fixed to the support beam body.

According to the invention as recited in the aforementioned Item [6], since the fitting portion of the bracket is provided with an elongate aperture and the fitting portion of the bracket is welded to the support beam body at the elongate aperture, the bracket can be assuredly fixed to the support beam body.

According to the invention as recited in the aforementioned Item [7], since the elongate aperture is formed along an axial direction or a circumferential direction of the fitting portion of the bracket, the welding workability can be enhanced, which in turn can improve the productivity.

According to the invention as recited in the aforementioned Item [8], since the fitting portion of the bracket is provided with a cut-out portion at a part of a circumferential direction thereof and the fitting portion of the bracket is welded to the support beam body at the cut-out portion, the bracket can be assuredly fixed to the support beam body.

According to the invention as recited in the aforementioned Item [9], since the fitting portion of the bracket is fixed to the support beam body by forming a friction stir welded portion at a part of a periphery of the fitting portion of the bracket, there is a merit that deformation due to thermal stress hardly occurs.

According to the invention as recited in the aforementioned Item [10], since the outer pipe and the brackets are extruded members, the productivity can be improved, which in turn can decrease the manufacturing cost.

According to the invention as recited in the aforementioned Item [11], since the support beam body and the outer pipe are extruded members and the brackets are cast members, the productivity can be improved, which in turn can decrease the manufacturing cost. Furthermore, since the brackets are cast members, the strength can be further enhanced.

According to the invention as recited in the aforementioned Item [12], since the extruded member is made of light metal or its alloy, it is possible to secure excellent workability while maintaining the sufficient lightweight.

According to the invention as recited in the aforementioned Item [13], since the extruded member is an aluminum extruded member, it is possible to secure excellent workability while maintaining excellent lightweight.

According to the invention as recited in the aforementioned Item [14], since the extruded member is a synthetic resin extruded member, it is possible to secure excellent workability while maintaining excellent lightweight.

According to the invention as recited in the aforementioned Item [15], the productivity can be improved, and structure simplification and weight saving can be attained.

According to the invention as recited in the aforementioned Item [16], the productivity can be improved, and structure simplification and weight saving can be attained.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF DRAWINGS

The preferred embodiments of the present invention are shown by way of example, and not limitation, in the accompanying figures, in which.

BEST MODE FOR CARRYING OUT THE INVENTION

In the following paragraphs, some preferred embodiments of the invention will be described by way of example and not limitation. It should be understood based on this disclosure that various other modifications can be made by those in the art based on these illustrated embodiments.

Figure 1:
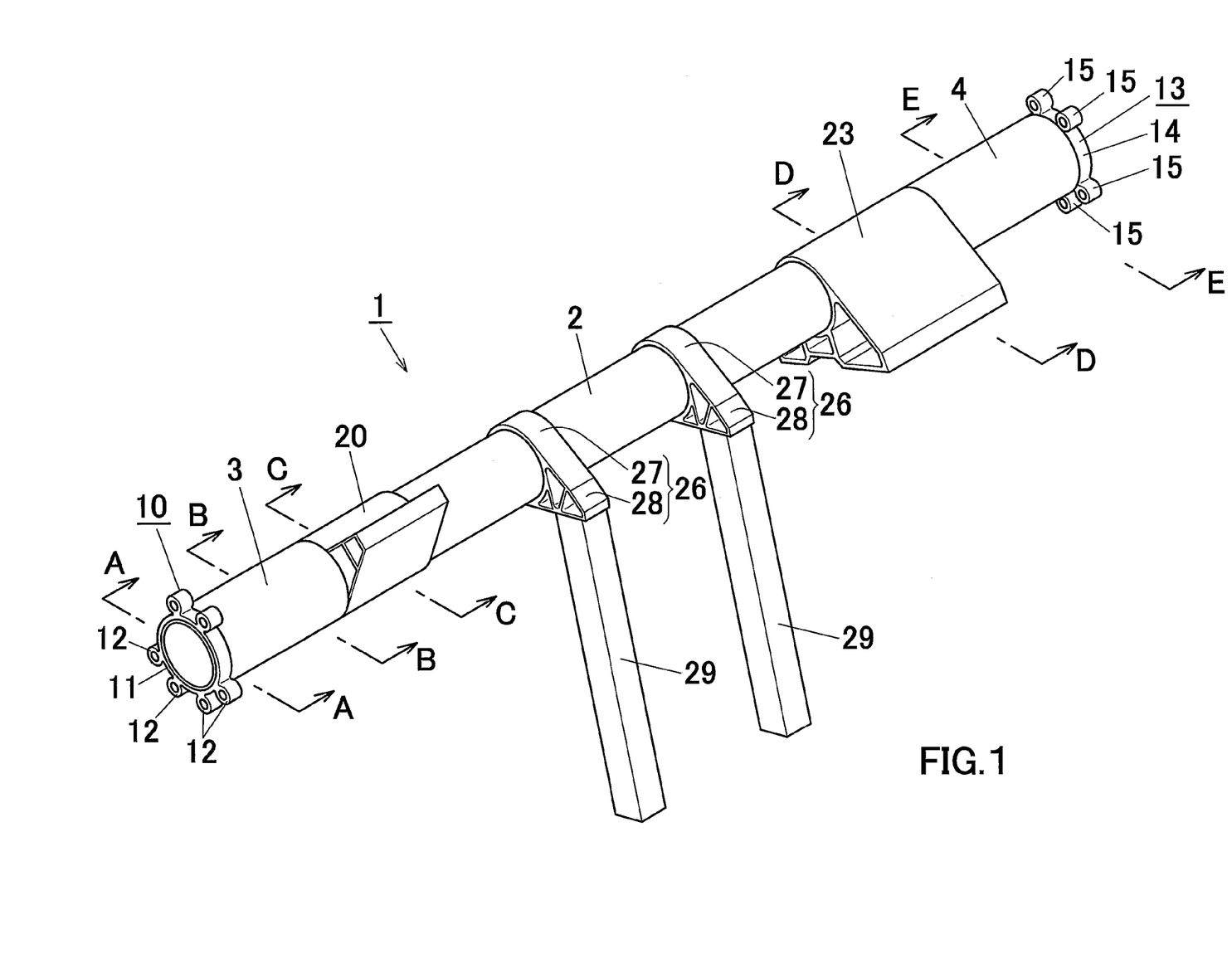
FIG. 1 is a perspective view showing a steering support beam according to an embodiment of this invention (welded portion is not shown)

An embodiment of a steering support beam 1 according to the present invention is shown in FIG. 1. This steering support beam 1 according to this embodiment is an automobile steering support beam to be disposed between right and left front pillars of an automobile body to connect these pillars. In FIG. 1, the reference numeral "2" denotes a support beam body, "3" and "4" denote outer pipes, "10" "13" "20" "23" and "26" denote brackets.

Figure 3:
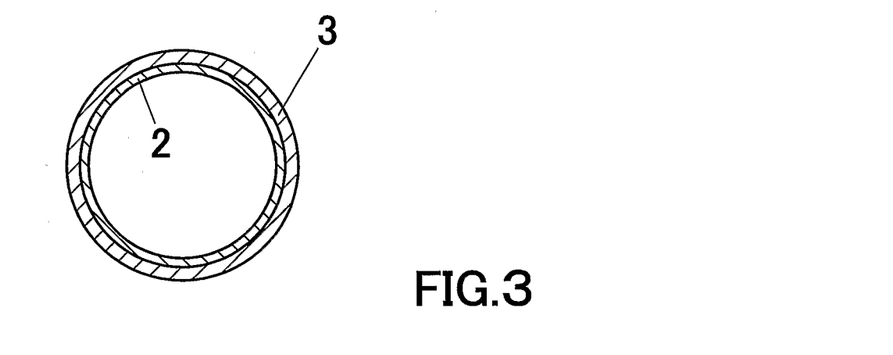
FIG. 3 is a cross-sectional view taken along the line B-B in FIG. 1.
Figure 6:
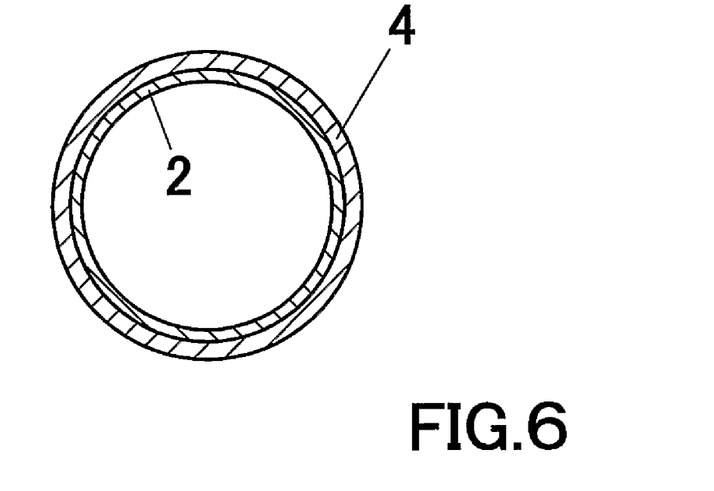
FIG. 6 is a cross-sectional view taken along the line E-E in FIG. 1.

The support beam body 2 is a long cylindrical extruded member. The outer pipe 3, 4 is a cylindrical extruded member capable of being fitted on the support beam body 2 (see FIGS. 1, 3 and 6).

Figure 2:
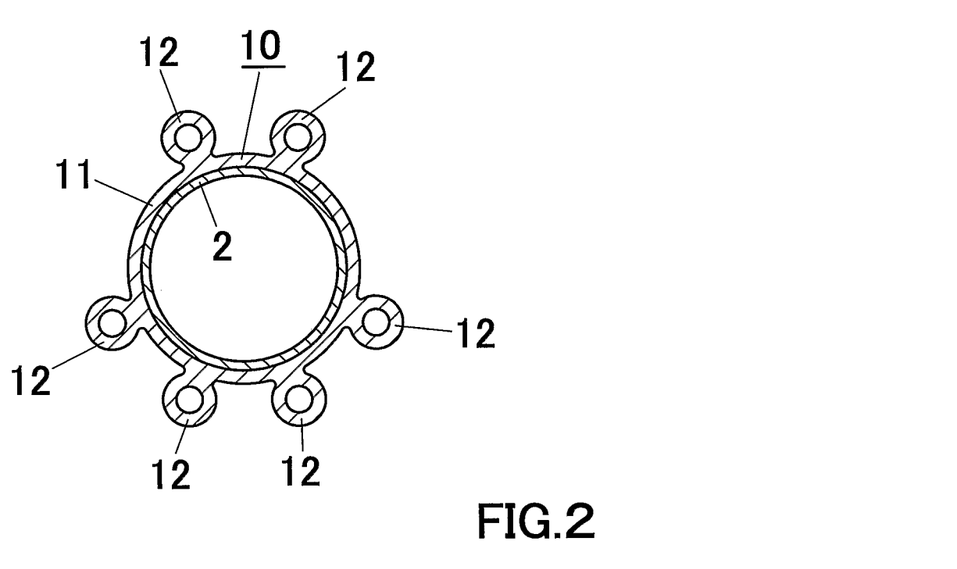
FIG. 2 is a cross-sectional view taken along the line A-A in FIG. 1.

As shown in FIGS. 1 and 2, the front pillar attaching side bracket 10 is comprised of a cylindrical fitting portion 11 capable of being fitted on the support beam body 2 and a plurality of ring-shaped attaching portions 12, 12, 12, 12, 12 and 12 outwardly protruded from the external surface of the fitting portion 11. The other front pillar attaching side bracket 13 is the same in shape and size as the aforementioned front pillar attaching side bracket 10. That is, this bracket 13 is also comprised of a cylindrical fitting portion 14 capable of being fitted on the support beam body 2 and a plurality of ring-shaped attaching portions 15, 15, 15, 15, 15 and 15 outwardly protruded from the external surface of the fitting portion 14 (see FIG. 1).

Figure 4:
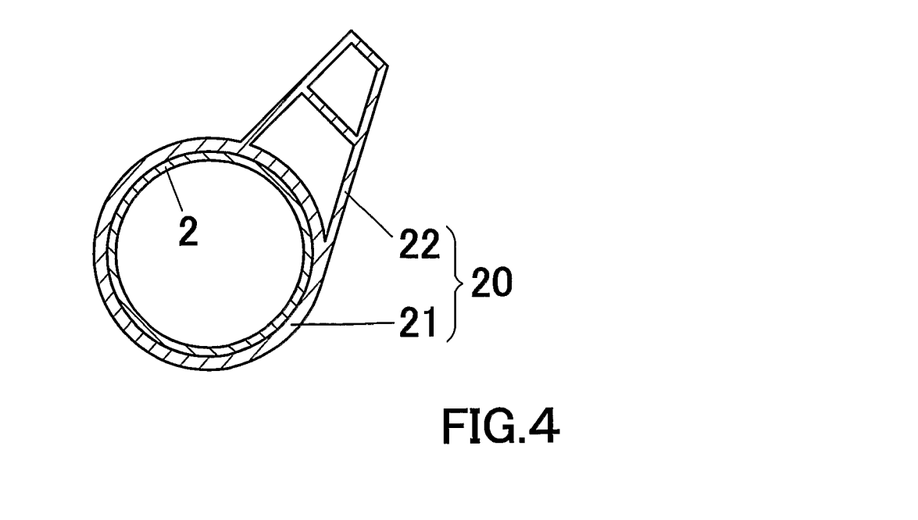
FIG. 4 is a cross-sectional view taken along the line C-C in FIG. 1.

As shown in FIGS. 1 and 4, the air-bag unit attaching bracket 20 is comprised of a cylindrical fitting portion 21 capable of being fitted on the support beam body 2 and an attaching portion 22 outwardly protruded from the external periphery of the fitting portion 21.

Figure 5:
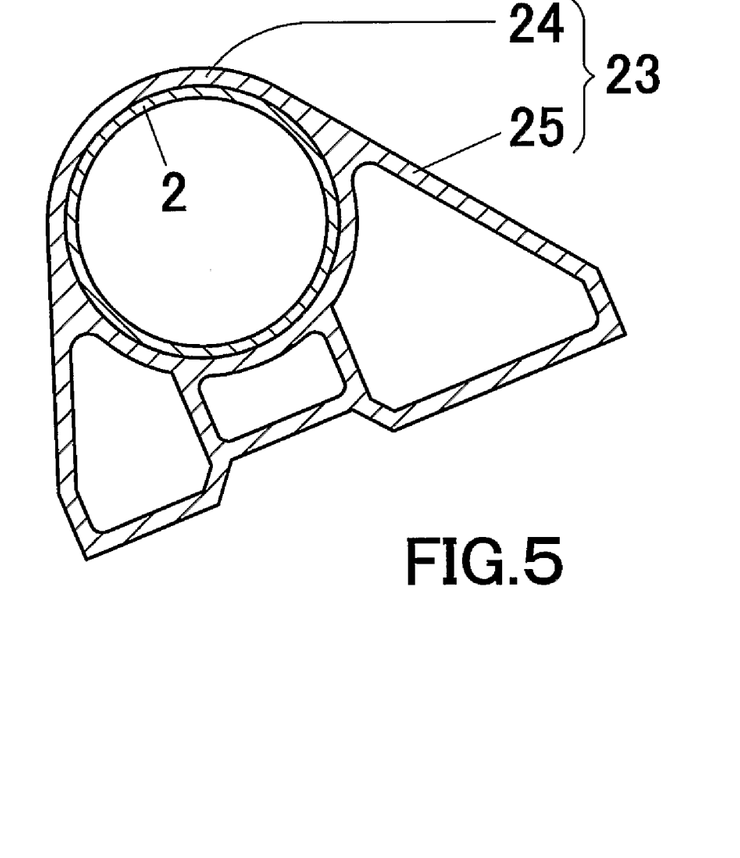
FIG. 5 is a cross-sectional view taken along the line D-D in FIG. 1.

Furthermore, as shown in FIGS. 1 and 5, the steering attaching bracket 23 is comprised of a cylindrical fitting portion 24 capable of being fitted on the support beam body 2 and an attaching portion 25 outwardly protruded from the external periphery of the fitting portion 24.

Furthermore, as shown in FIG. 1, each center bracket 26 is comprised of a cylindrical fitting portion 27 capable of being fitted on the support beam body 2 and a protruded portion 28 outwardly protruded from the external periphery of the fitting portion 27. Connected to the protruded portion 28 is a long center stay 29.

The aforementioned brackets 10, 13, 20, 23 and 26 are extruded members, respectively.

At one end portion of the support beam body 2, the front pillar attaching side bracket 10 is fixed to the support beam body 2 with the fitting portion 11 of the side bracket 10 outwardly fitted on the end portion of the support beam body 2 and welded thereto. The outer pipe 3 is fitted on the support beam body 2 in a state in which the end thereof is in contact with the fitting portion 11 of the side bracket 10, and the air-bag attaching bracket 20 is fitted on the support beam body 2 in a state in which the end thereof is in contact with the outer pipe 3. The fitting portion 21 of the air-bag unit attaching bracket 20 is welded to the support beam body 2. Thus, the fitting portion 21 of the air-bag unit attaching bracket 20 is fixed to the support beam body 2 with a high degree of accuracy in a state in which the outer pipe 3 is disposed between the fitting portion 21 of the air-bag unit attaching bracket 20 and the fitting portion 11 of the front pillar attaching side bracket 10.

At the other end of the support beam body 2, the front pillar attaching side bracket 13 is fixed to the support beam body 2 with the fitting portion 14 of the front pillar attaching side bracket 13 outwardly fitted on the end portion of the support beam body 2 and welded thereto. The outer pipe 4 is fitted on the support beam body 2 in a state in which the end thereof is in contact with the fitting portion 14 of the front pillar attaching side bracket 13, and the steering attaching bracket 23 is fitted on the support beam body 2 in a state in which the end thereof is in contact with the outer pipe 3. The fitting portion 24 of the steering attaching bracket 23 is welded to the support beam body 2. Thus, the fitting portion 24 of the steering attaching bracket 23 is fixed to the support beam body 2 with a high degree of accuracy in a state in which the outer pipe 4 is disposed between the fitting portion 24 of the steering attaching bracket 23 and the fitting portion 14 of the front pillar attaching side bracket 13.

At the longitudinal intermediate positions of the support beam body 2 located between the air-bag unit attaching bracket 20 and the steering attaching bracket 23, the fitting portions 27 of the center brackets 26 are fitted on the support beam 2 and welded thereto. Connected to the protruded portion 28 of each center bracket 26 is a long center stay 29.

The lower end portion of each center stay 29 is to be connected to a compartment floor. The one end side front pillar attaching side bracket 10 is to be fixed to a front pillar of an automobile body with fixing means such as bolts inserted through apertures of the attaching portions 12, 12, 12, 12, 12 and 12, and the other end side front pillar attaching side bracket 13 is to be fixed to a front pillar of an automobile body with fixing means such as bolts inserted through apertures of the attaching portions 15, 15, 15, 15, 15 and 15. Thus, the steering support beam 1 can be assuredly fixed to an automobile body in a stable manner.

In the steering support beam 1 of this embodiment, the fitting portion 21 of the air-bag unit attaching bracket 20 is fixed to the support beam body 2 by being positioned by the outer pipe 3 fitted on the support beam body 2 and disposed between the fitting portion 11 of the one side bracket 10 and the fitting portion 21 of the air-bag unit attaching bracket 20, and the fitting portion 24 of the steering attaching bracket 23 is fixed to the support beam body 2 by being positioned by the outer pipe 4 fitted on the support beam body 2 and disposed between the fitting portion 14 of the other side bracket 13 and the fitting portion 24 of the steering attaching bracket 23. Therefore, the air-bag unit attaching bracket 20 and the steering attaching bracket 23 can be fixed to the support beam body 2 with a high degree of accuracy. Furthermore, it becomes possible to position the brackets 20 and 23 with a high degree of accuracy by simply disposing the outer pipes 3 and 4, and a conventional flanges or internal fitting grooves extending along the longitudinal direction of the support beam body are not required. Therefore, the welding workability can be enhanced, resulting in enhanced productivity, and the steering support beam 1 can be simplified in structure and decreased in weight.

Figure 11:
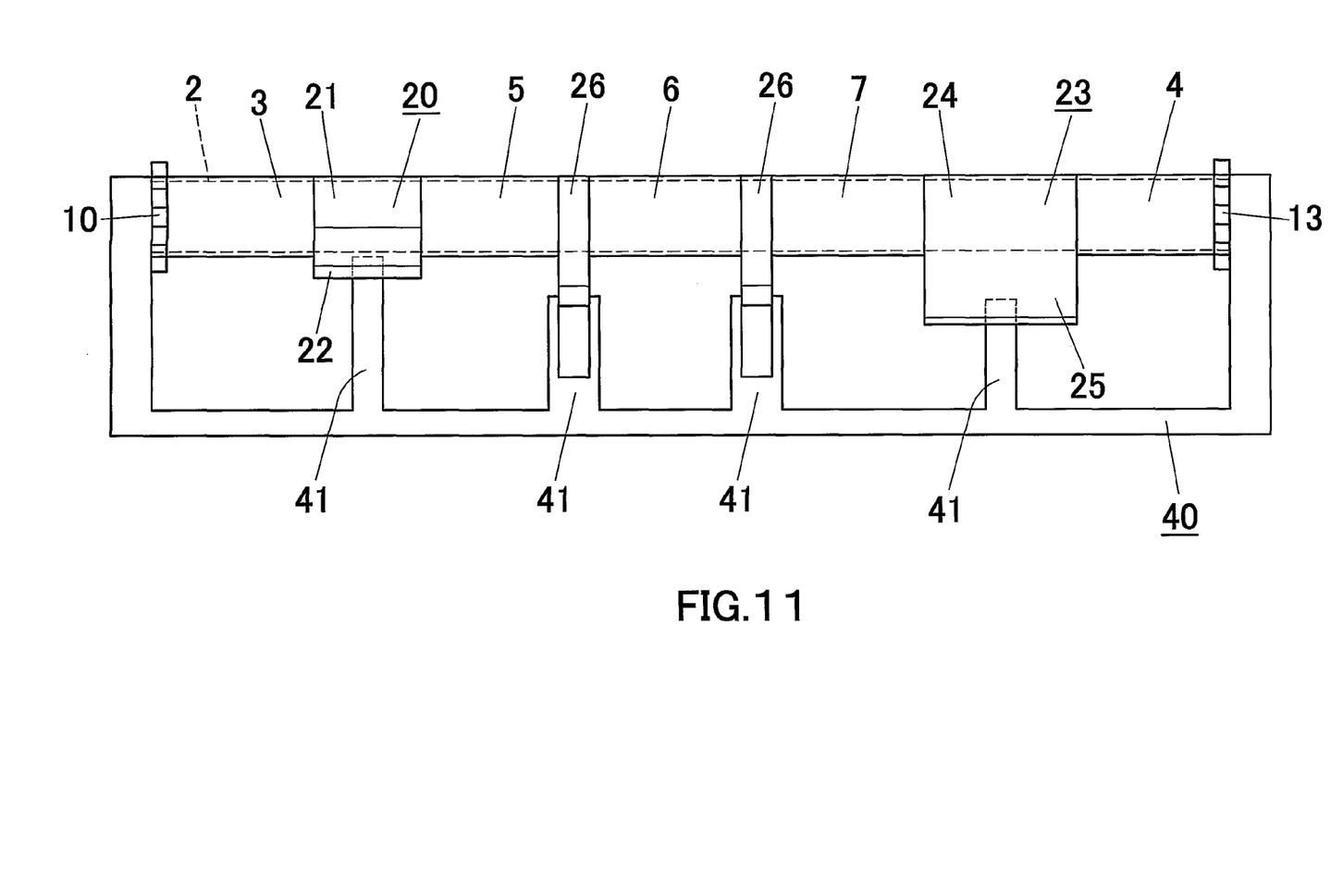
FIG. 11 is a plain view showing an example of a welding status using welding jigs.

Furthermore, since the positioning of the air-bag unit attaching bracket 20 and that of the steering attaching bracket 23 can be performed by disposing the outer pipes 3 and 4, structure of welding jigs 40 to be used at the time of welding can be simplified, which in turn can further improve the welding workability. In other words, in welding these brackets 20 and 23 to the support beam body 2, the positioning of the brackets 20 and 23 with respect to the longitudinal direction (axial direction of the beam body) can be performed with a high degree of accuracy by the outer pipes 3 and 4. Accordingly, as for the structure of welding jigs 40, as shown in FIG. 11 for example, it is only required to employ structure capable of positioning the brackets 20 and 23 with respect to the circumferential direction thereof while supporting the attaching portions 22 and 25 of the brackets 20 and 23, the structure of the welding jig 40 can be simplified.

Furthermore, the steering support beam 1 is enhanced in strength because of the double tube structure that the outer pipes 3 and 4 are fitted on the support beam 1.

In the aforementioned embodiment, although the outer pipes 3 and 4 are merely fitted on the support beam body 2 and not fixed thereto, these pipes 3 and 4 can also be fixed to the support beam body 2 like the aforementioned brackets.

Furthermore, in the aforementioned embodiment, although the support beam body 2 is cylindrical in cross-sectional shape, the shape is not limited to it. For example, the support beam body 2 can be of a polygonal (e.g., hexagonal) cross-sectional shape, an elliptical cross-sectional shape, or any other modified cross-sectional shape. For example, in cases where the support beam body 2 is polygonal in cross-sectional shape, the fitting portion of each of the aforementioned brackets and the outer pipes are formed into a corresponding polygonal cross-sectional shape respectively.

Figure 10:
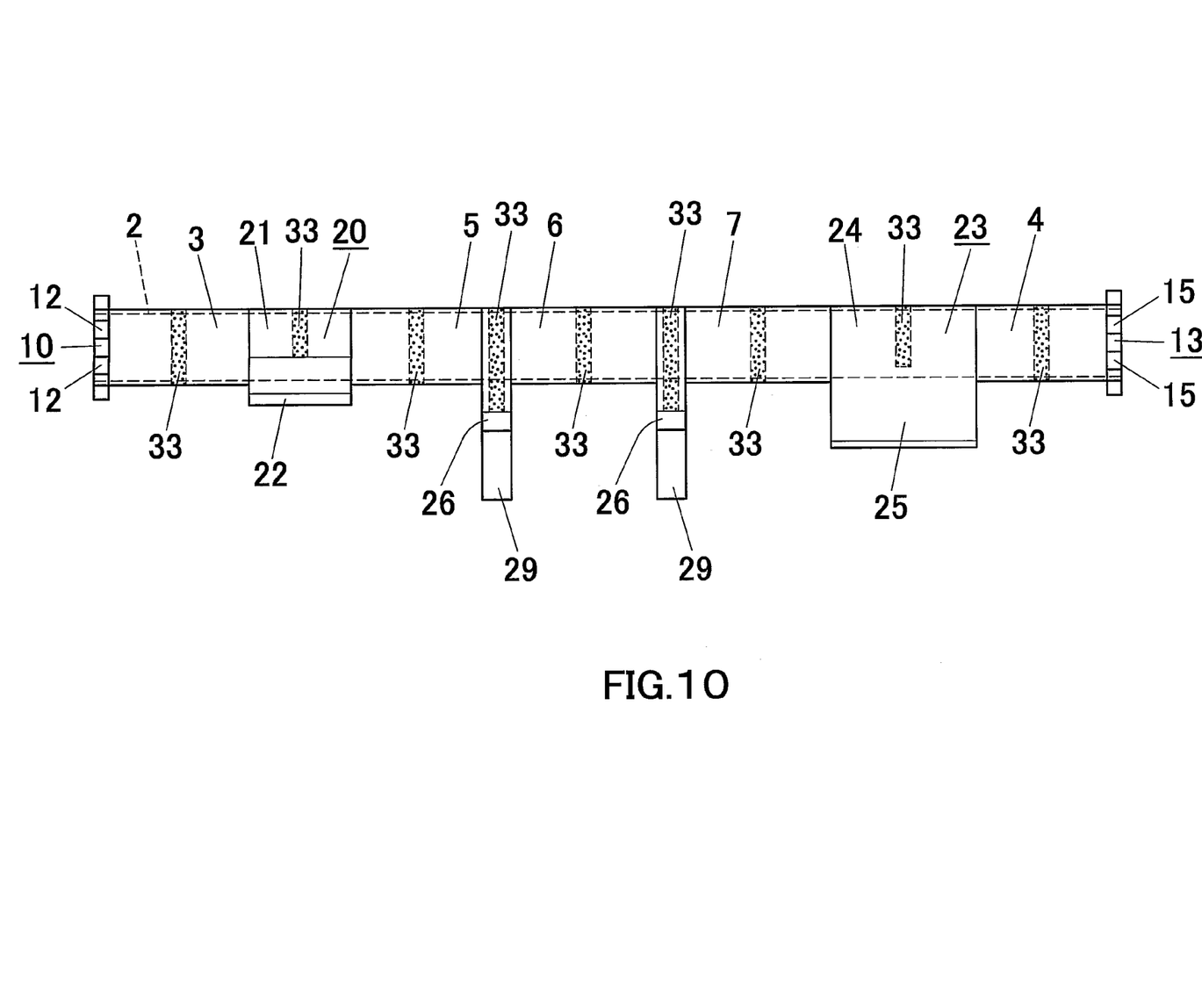
FIG. 10 is a plain view showing a steering support beam according to another embodiment.

Furthermore, in the aforementioned embodiment, the outer pipes 3 and 4 are disposed only between the fitting portion 21 of the air-bag unit attaching bracket 20 and the fitting portion 11 of the one side front pillar attaching side bracket 10 and between the fitting portion 24 of the steering attaching bracket 23 and the fitting portion 14 of the other side front pillar attaching side bracket 13. However, positions of outer pipes are not limited to the above. For example, as shown in FIG. 10, it is possible to employ such a structure that outer pipes 3, 5, 6, 7 and 4 are disposed between adjacent brackets 10, 20, 26, 26, 23 and 13, respectively.

Furthermore, in the aforementioned embodiment, although all of the support beam body 2, the outer pipes 3, 4, 5, 6 and 7 and the brackets 10, 13, 20, 23 and 26 are extruded members, the present invention is not limited to it. For example, the support beam body 2, the outer pipes 3, 4, 5, 6 and 7 and the brackets 10, 13, 20, 23 and 26 can be injected members. Moreover, the brackets 10, 13, 20, 23 and 26 can be cast members.

It is preferable that the extruded member is made of light metal or its alloy. Among other things, it is especially preferable that the extruded member is an aluminum extruded member. In this case, it is possible to attain excellent workability while keeping excellent lightweight characteristic.

Alternatively, it is also preferable that the extruded member is a synthetic resin extruded member. In this case too, it is possible to attain excellent workability while keeping excellent lightweight characteristic.

Figure 9:
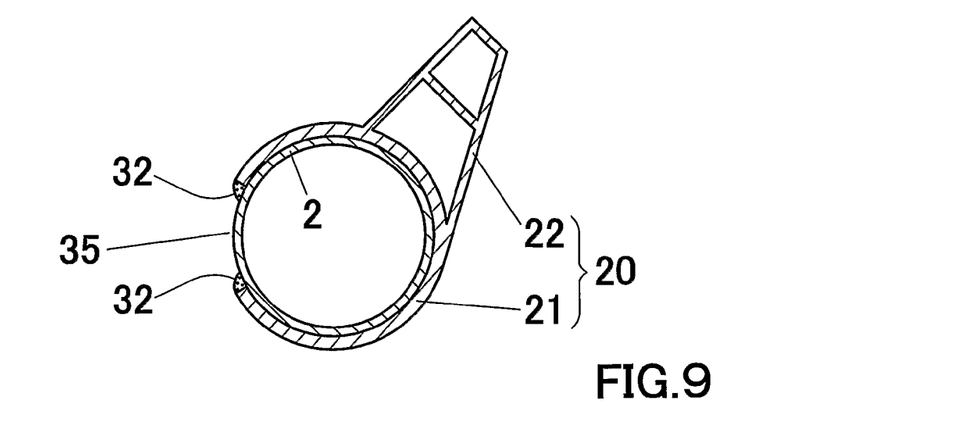
FIG. 9 is a cross-sectional view showing another modification of welding of the bracket.

In this invention, the cross-sectional shape of the fitting portion 11, 14, 21, 24 and 27 of the bracket 10, 13, 20, 23 and 26 is not specifically limited so long as the support beam body 2 can be fitted in the hollow space of the fitting portion. In other words, the cross-sectional shape of the fitting portion 11, 14, 21, 24 and 27 of the bracket is not specifically limited so long as the fitting portion cannot be detached from the support beam body 2 once the fitting portion is fitted on the support beam body 2. For example, the fitting portion 11, 14, 21, 24 and 27 of the bracket can be formed into a complete cylindrical shape in the same manner as in the aforementioned embodiment. Alternatively, as shown in FIG. 9, the fitting portion 21 of the bracket 20 can be formed into an incomplete cylindrical shape with a cut-portion 35 formed at a part of the peripheral wall.

Similarly, the cross-sectional shape of the outer pipe 3, 4, 5, 6 and 7 is not specifically limited so long as the outer pipe can be fitted on the support beam body 2 when the support beam body 2 is inserted in the outer pipe. In other words, the cross-sectional shape of the outer pipe 3, 4, 5, 6 and 7 is not specifically limited so long as the fitting portion cannot be detached from the support beam body 2 once the outer pipe is fitted on the support beam body 2. For example, the outer pipe 3, 4, 5, 6 and 7 can be formed into a complete cylindrical shape in the same manner as in the aforementioned embodiment. Alternatively, the outer pipe 3, 4, 5, 6 and 7 can be formed into an incomplete cylindrical shape with a cut-portion formed at a part of the peripheral wall.

It is preferable to design such that a clearance (i.e., a gap between the support beam body and the fitting portion) falls within the range of 0.2 mm to 0.3 mm in a state in which the fitting portion 11, 14, 21, 24 and 27 of the bracket 10, 13, 20, 23 and 26 is fitted on the support beam body 2 (before welding processing). However, the present invention is not limited to the above. The bracket comes into close contact with the support beam body 2 because of the shrinkage due to the thermal strain to be fixed thereto.

In the same manner, it is preferable to design such that a clearance (i.e., a gap between the support beam body and the outer pipe) falls within the range of 0.2 mm to 0.3 mm in a state in which the outer pipe 3, 4, 5, 6 and 7 is fitted on the support beam body 2 (before welding processing). However, the present invention is not limited to the above.

In the present invention, a method for fixing the brackets 10, 13, 20, 23 and 26, etc. to the support beam body 2 is not specifically limited. For example, it can be fixed by welding or solid-phase welding by a friction stir welding method.

Figure 7:
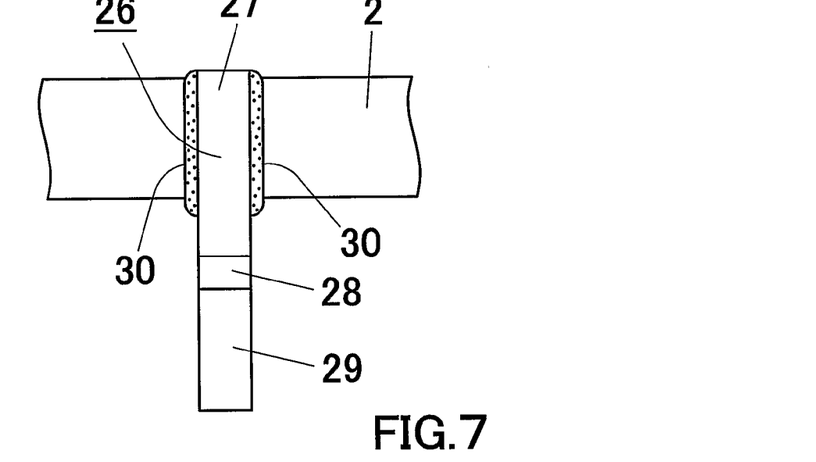
FIG. 7 is a plain view showing an example of welding of the bracket.

Furthermore, in the present invention, welding position, welding manner, etc. are not specifically limited. For example, as shown in FIG. 7, it can be possible to employ such structure that at least one axial side edge portion of the fitting portion 27 of the bracket 26 can be welded along the entire circumference. In the embodiment shown in FIG. 7, both axial side edge portions of the fitting portion of the bracket 26 are welded along the periphery thereof to form a welded portions 30 and 30.

Figure 8:
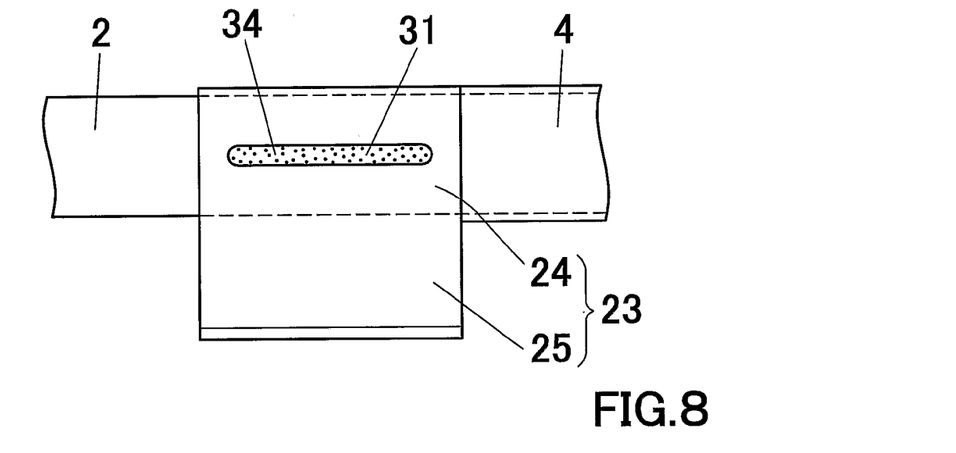
FIG. 8 is a plain view showing a modification of welding of the bracket.

Alternatively, as shown in FIG. 8, it can be possible to employ such structure that the fitting portion 24 of the bracket 23 is welded to the support beam body 2 through an elongated aperture 34 formed along the axial direction of the fitting portion 24. Although the forming direction of the elongated aperture 34 is not specifically limited, it is preferable to form the elongated aperture 34 along the axial direction or the circumferential direction of the fitting portion of the bracket.

Alternatively, as shown in FIG. 9, it is possible to employ such structure that the fitting portion 21 of the bracket 20 is welded to the support beam body 2 through a cut-portion 35 formed at a part of the periphery of the fitting portion.

Furthermore, in cases where the bracket 10 (13, 20, 23, 26) is fixed to the support beam body 2 by a solid-phase welding in accordance with a friction stir welding method, as shown in FIG. 10 for example, a friction stir welded portion 33 can be formed at a part of a periphery of the fitting portion of the bracket along the circumferential direction thereof. Of course, such friction stir welded portion 33 can be formed along the axial direction of the fitting portion or along another direction. In the embodiment shown in FIG. 10, the outer pipes 3, 5, 6, 7 and 4 are also fixed to the support beam body 2 by a solid-welding in accordance with a friction stir welding method. In other words, a friction stir welded portion 33 is formed at least a part of the outer pipe 3 (5, 6, 7, 4) along the circumferential direction thereof.

Figure 12:
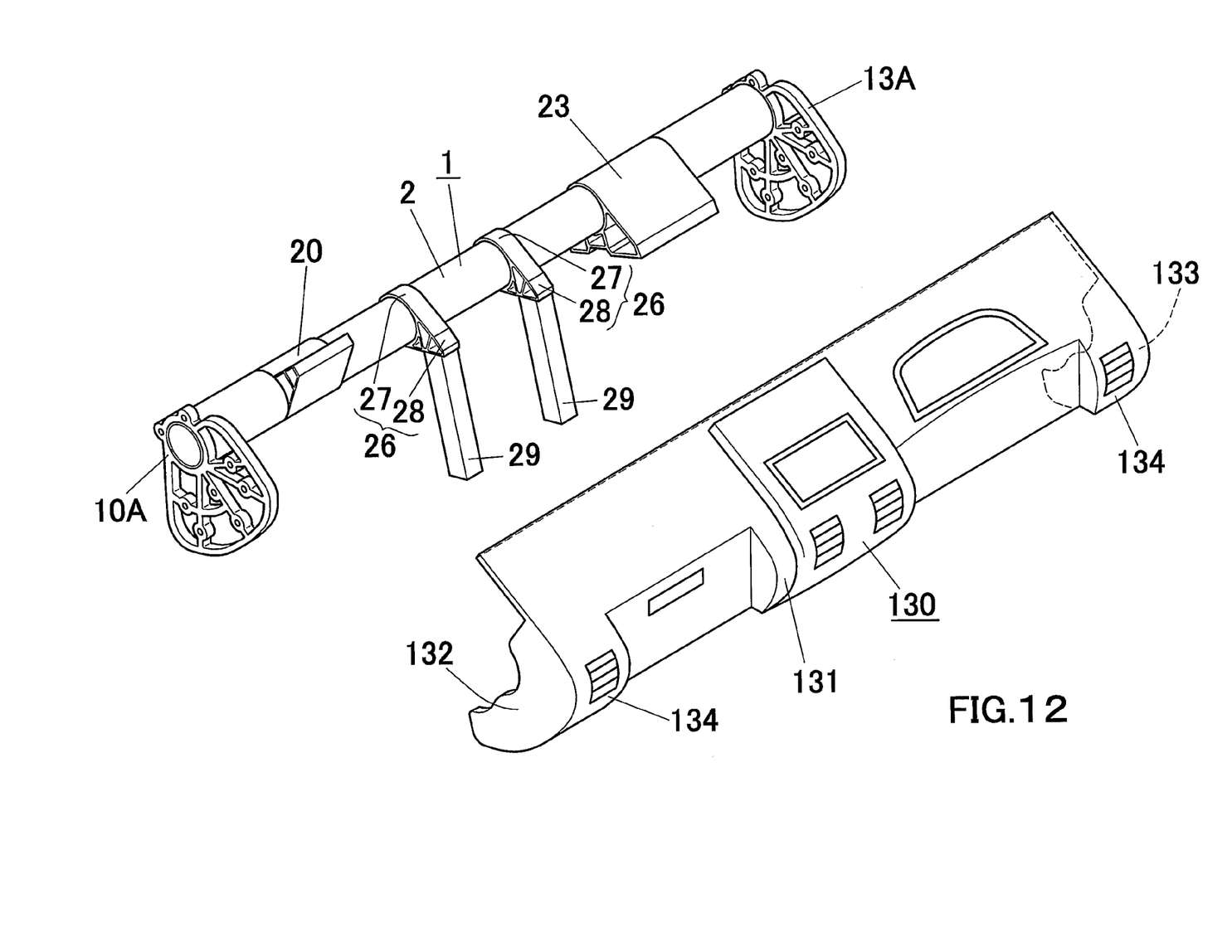
FIG. 12 is an exploded perspective view showing an instrument panel mounting structure.

An embodiment of an instrument panel mounting structure (vehicle front portion structure) using the steering support beam of this invention is shown in FIG. 12. This instrument panel mounting structure of this embodiment is an instrument panel mounting structure to be mounted on a front portion in an automobile. In FIG. 12, the reference numeral "1" denotes a steering support beam of this invention, "10A" and "13A" denote mounting side brackets, "130" is an instrument panel.

As shown in FIG. 12, this instrument panel 130 is constituted such that side plate portions 132 and 133 extend from both end portions of the panel main body 131 toward the rear side (i.e., toward the inner side). This panel main body 131 is provided with a box to be located in front of a front passenger, an air-conditioning ventilation opening, or the like. The inner (rear) side of each of both end portions of the panel main body 131 is formed to have a corresponding configuration portion 134 capable of fitting the external configuration of the extended portion of the side bracket 10A and 13A. The side plate portions 132 and 133 are respectively formed to have a size and a shape capable of covering the most part of the extended portions of the side brackets 10A and 13A. Thus, the instrument panel 130 can be fixed to the steering support beam 1 via the side brackets 10A and 13A by the portions 134 and/or the side plate portions 132 and 133.

INDUSTRIAL APPLICABILITY

This invention can be preferably applied to a steering support beam to be bridged between right and left sides of a vehicle body such as an automobile body. Among other things, this invention can be preferably applied to an automobile steering support beam.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." In this disclosure and during the prosecution of this application, means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure and during the prosecution of this case, the following abbreviated terminology may be employed: "e.g." which means "for example;" and "NB" which means "note well."

The invention claimed is:

1. A steering support beam, comprising:
a cylindrical support beam body;
a plurality of brackets each having a fitting portion externally fitted on the cylindrical support beam body and fixed thereto; and
an outer pipe externally fitted on the support beam body such that the support beam body is provided within an internal space of the outer pipe,
wherein the fitting portion of a first bracket of the plurality of brackets is disposed so as to be in contact with a first axial end of the outer pipe,
wherein the fitting portion of a second bracket of the plurality of brackets is disposed so as to be in contact with a second axial end of the outer pipe such that the outer pipe is interposed between the fitting portions of the first and second brackets, and
wherein the fitting portion of at least one of the first and second brackets is fixed to the support beam body in an axially positioned state and configured to hold the outer pipe externally fitted on the support beam body.

2. A steering support beam, comprising:
a cylindrical support beam body;
front pillar attaching side brackets externally fitted on and fixed to end portions of the cylindrical support beam body, respectively;
a plurality of parts attaching brackets each having a fitting portion fitted on an axial intermediate portion of the support beam body and fixed thereto; and
an outer pipe externally fitted on the support beam body such that the support beam body is provided within an internal space of the outer pipe, wherein the fitting portion of at least one of the plurality of parts attaching brackets is disposed so as to be in contact with a first axial end of the outer pipe, wherein the fitting portion of at least one of the front pillar attaching side brackets is disposed so as to be in contact with a second axial end of the outer pipe such that the outer pipe is interposed between the fitting portions of the at least one parts attaching bracket and the at least one front pillar attaching side bracket, and wherein the fitting portion of at least one of the at least one parts attaching bracket and the at least one front pillar attaching side bracket is fixed to the support beam body in an axially positioned state and configured to hold the outer pipe externally fitted on the support beam body.

3. A steering support beam, comprising:

a cylindrical support beam body;

front pillar attaching side brackets externally fitted on and fixed to end portions of the cylindrical support beam body, respectively;

an air-bag unit attaching bracket having a fitting portion fitted on an axial intermediate portion of the support beam body and fixed thereto;

a steering attaching bracket having a fitting portion fitted on an axial intermediate portion of the support beam body and fixed thereto; and outer pipes each externally fitted on the support beam body such that the support beam body is provided within an internal space of each outer pipe, wherein the fitting portion of the air-bag unit attaching bracket is disposed so as to be in contact with a first axial end of a first outer pipe and the fitting portion of a first one of the front pillar attaching side brackets is disposed so as to be in contact with a second axial end of the first outer pipe such that the first outer pipe is interposed between the fitting portions of the air-bag unit attaching bracket and the first front pillar attaching side bracket, wherein the fitting portion of at least one of the air-bag unit attaching bracket and the first front pillar attaching side bracket is fixed to the support beam body in an axially positioned state and configured to hold the outer pipe externally fitted on the support beam body, wherein the fitting portion of the steering attaching bracket is disposed so as to be in contact with a first axial end of a second outer pipe and the fitting portion of a second one of the front pillar attaching side brackets is disposed so as to be in contact with a second axial end of the second outer pipe such that the second outer pipe is interposed between the fitting portions of the steering attaching bracket and the second front pillar attaching side bracket, wherein the fitting portion of at least one of the steering attaching bracket and the second front pillar attaching side bracket is fixed to the support beam body in an axially positioned state and configured to hold the second outer pipe externally fitted on the support beam body.

4. The steering support beam as recited in any one of claims 1 to 3, wherein the fixing of the fitting portion of the bracket to the support beam body is performed by welding.

5. The steering support beam as recited in claim 4, wherein the fitting portion of the bracket is fixed to the support beam body by welding at least one of axial edge portions of the fitting portion of the bracket along the circumferential direction thereof.

6. The steering support beam as recited in claim 4, wherein the fitting portion of the bracket is provided with an elongate aperture, and wherein the fitting portion of the bracket is welded to the support beam body at the elongate aperture.

7. The steering support beam as recited in claim 6, wherein the elongate aperture is formed along an axial direction or a circumferential direction of the fitting portion of the bracket.

8. The steering support beam as recited in claim 4, wherein the fitting portion of the bracket is provided with a cut-out portion at a part of a periphery of the fitting portion, and wherein the fitting portion of the bracket is welded to the support beam body at the cut-out portion.

9. The steering support beam as recited in any one of claims 1 to 3, wherein the fitting portion of the bracket is fixed to the support beam body by forming a friction stir welding portion at a part of a periphery of the fitting portion of the bracket.

10. The steering support beam as recited in any one of claims 1 to 3, wherein the support beam body, the outer pipe and the brackets are extruded members.

11. The steering support beam as recited in any one of claims 1 to 3, wherein the support beam body and the outer pipe are extruded members, and the brackets are cast members.

12. The steering support beam as recited in claim 10, wherein the extruded member is made of light metal or its alloy.

13. The steering support beam as recited in claim 10, wherein the extruded member is an aluminum extruded member.

14. The steering support beam as recited in claim 10, wherein the extruded member is a synthetic resin extruded member.

15. The steering support beam as recited in claim 11, wherein the extruded member is made of light metal or its alloy.

16. The steering support beam as recited in claim 11, wherein the extruded member is an aluminum extruded member.

17. The steering support beam as recited in claim 11, wherein the extruded member is a synthetic resin extruded member.

18. An instrument panel mounting structure using the steering support beam as recited in any one of claims 1 to 3.

19. A vehicle provided with the steering support beam as recited in any one of claims 1 to 3.

* * * * *